United States Patent Office 3,019,122
Patented Jan. 30, 1962

3,019,122
GLASS FIBER SURFACE TREATMENT
George E. Eilerman, Perrysville, Pa., assignor to Pittsburgh Plate Glass Company, Allegheny County, Pa., a corporation of Pennsylvania
No Drawing. Filed Dec. 15, 1958, Ser. No. 780,261
4 Claims. (Cl. 106—287)

The present invention relates to a glass fiber treatment and it has particular relation to an aqueous treating solution for glass fibers which are to be employed as a reinforcement for resins and plastics. This application is a continuation-in-part of my copending application Serial No. 752,412, filed August 1, 1958 which is a continuation-in-part of application Serial No. 543,005, filed October 26, 1955, now abandoned.

A glass fiber strand is composed of a multitude of fine glass filaments which are formed by being drawn at a high rate of speed from molten cones of glass located at the tips of small orifices in a bushing such as shown in U.S. Patent No. 2,133,238. During manufacture, the filaments are coated while moving at a rate of speed of the order of 5,000 to 20,000 feet per minute with a size which contains a binder to give the strand integrity for workability, i.e., for twisting, plying and weaving. If the strand does not have proper integrity, fuzzing or breaking of the individual filaments occurs during these operations and eventually the strand breaks. The size also contains a lubricant for the filaments to prevent destruction of the strand by abrasion of the individual filaments against each other or against fiber handling equipment.

It is common practice to use glass fiber strands and glass fiber cloth as a reinforcement for resins. For such use, the glass fibers are coated with a coupling agent or finish material which makes the surface of the glass fibers hydrophobic and compatible with the particular resins with which they are to be employed. These coupling agents greatly increase the dry and wet flexural strengths of the glass fiber-resin laminates. When the glass fibers are to be employed in the form of woven cloth as a reinforcement for resins, the coupling agent is applied in an aqueous solution to the fibers after they have been woven into cloth and after the cloth has been cleaned to remove the size. Starch and a vegetable oil are generally employed as a size for glass fibers when they are twisted, plied and woven into cloth. This starch must be removed prior to lamination of the glass fiber cloth with the resin because the starch prevents the formation of a strong bond between the glass and the resin.

The use of various organosilicon compounds as surface treating agents for glass fibers is known. The use of alkenyl and alkyl silicon halides to render glass surfaces hydrophobic is shown in U.S. Patents Nos. 2,303,222 and 2,420,919. A number of organosilicon compounds are listed in U.S. Patents Nos. 2,390,370 and 2,392,805. These compounds are stated to be useful as lubricants and binders for glass fibers.

A few organosilicon compounds have shown desirable properties for acting as coupling agents to improve the dry and wet strength of glass fiber-resin laminates. Allyl ethoxy and allylchloro silanes are disclosed for this purpose in U.S. Patent No. 2,563,288 and vinyl triethoxy silane is disclosed in U.S. Patent No. 2,649,396. Vinyl trichloro silane has also been suggested for this purpose.

It is highly desirable that the organosilicon compound be soluble in an aqueous solution which is simple to prepare and stable during storage and use. The use of allyl and vinyl chloro or ethoxy silanes in aqueous solutions is accompanied with many difficulties. They are difficult to prepare in stable form. In some instances, the silicon derivative is too reactive to use without a preliminary hydrolysis step. Products resulting from this hydrolysis remain in the finish and interfere with the refractive index of the glass interface. Some of the organosilicon compounds require excessively high temperatures to cause "fixation" on the glass fibers. This results in the requirement of special production procedures. Other silicon derivatives require controlled hydrolysis with consequent lack of stability.

Careful control of the pH of some aqueous silane solutions or dispersions has been required to provide stable solutions. The pH is controlled by the addition of acids or alkaline materials to obtain the required pH and often the pH must be changed from the acid to the alkaline side or vice-versa in order to produce the desired stable, silane treating solution. Some patents which deal with these problems are U.S. Nos. 2,688,006, 2,688,007, 2,723,210, 2,723,211, 2,763,629 and 2,834,693 and Canadian Nos. 556,017 and 556,018. Production losses are high when such materials polymerize or precipitate from solution and become unfit for application to the glass fiber.

In accordance with the present invention a stable, aqueous silane solution is provided which is easily prepared and applied to glass fibers. It has been discovered that alkenyl triacyloxy silanes may be combined with water as the sole solvent to form a stable treating solution. The alkenyl triacyloxy silanes are readily soluble in water and remain stable in aqueous solutions for periods of several hours. The alkenyl triacyloxy silanes become "affixed" to the glass fibers at relatively low temperatures.

Of particular interest in the practice of the invention is vinyl triacetoxy silane. The alkenyl triacyloxy silanes contemplated for use in the present invention may be illustrated by the following structural formula:

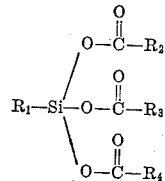

wherein $R_1$ is an alkenyl radical selected from the group consisting of vinyl and allyl radicals and $R_2$, $R_3$ and $R_4$ are alkyl or substituted alkyl radicals containing 1 to 5 carbon atoms.

Typical examples of alkenyl thiacyloxy silanes which are usable in accordance with the present invention are listed below:

Vinyl triacetoxy silane
Vinyl diacetoxy monopropionoxy silane
Vinyl monoacetoxy dipropionoxy silane
Allyl triacetoxy silane
Vinyl tributyroxy silane
Vinyl tripropionoxy silane
Allyl diacetoxy monopropionoxy silane
Allyl acetoxy dipropionoxy silane
Allyl tripropionoxy silane
Vinyl trimonochloroacetoxy silane, etc.

The invention is further described in conjunction with the use of vinyl triacetoxy silane as the essential ingredient of the glass fiber finish, although the use of the above-described alkenyl triacyloxy silanes is contemplated in each instance. The alkenyl triacyloxy silanes which are to be used in the present invention may be produced by reaction of an alkenyl halosilane with an acid anhydride. For example, vinyl triacetoxy silane may be produced by reacting vinyl trichloro silane with acetic anhydride using triethanol amine as a catalyst for the reaction.

The use of vinyl triacetoxy silane and related silanes as described above with respect to their application in an aqueous solution to glass fibers, such as heat-cleaned glass fiber cloth, is now described. In the preparation of the treating solution, 1 to 5 parts by weight of vinyltriacetoxy silane are added to 99 to 95 parts by weight of water and the solution is stirred for five minutes at room temperature. The aqueous solution of vinyl triacetoxy silane as thus prepared remains clear and stable for several hours. No organic solvents are needed to maintain the silane in solution nor are any acids or bases required to provide the solution with a particular pH so as to maintain the stability of the solution. The pH of a solution as thus prepared is 1.7.

Heat-cleaned glass fiber cloth was dipped into this solution. The glass cloth had previously been heated to a temperature of about 1100 to 1400° F. to remove the size on the cloth. The treated cloth was heated at a temperature of 350° F. for twenty to thirty minutes to affix the silane on the glass surface.

A glass fiber-reinforced resin was then produced by pouring an unsaturated polyester resin such as a styrenated polyester resin onto and into 7 superposed layers of the treated cloth. Sufficient resin was poured onto the layers of cloth to thoroughly impregnate the cloth and to constitute the resin content at approximately 60 percent by weight of the laminate. Thereafter, the laminate was heated to a temperature of 250° F. under a pressure of 150 pounds per square inch for 5 minutes in a stainless steel press.

The cured laminate was tested for its wet and dry flexural strength. After the dry flexural strength was determined, the laminate was subjected to immersion in boiling water for 3 hours and thereafter tested for its flexural strength.

Layers of glass fiber cloth were also treated with the following treating agents. (2) A commercially available "chrome" finish known as "Volan" (methacrylate chromic chloride). (3) An aqueous solution of vinyl triethoxy silane prepared so as to have its pH adjusted to approximately 3. Laminates were formed of glass fiber cloth treated with each of the above finishes and the same styrenated polyester as employed above. Tests were made of the wet and dry flexural strengths of these materials. The results of these tests are set forth in the table below.

Table I

| Finish | Flexural Strength, Pounds Per Square Inch | |
| --- | --- | --- |
|  | Dry | Wet |
| (1) Vinyl triacetoxy silane | 24,451 | 18,054 |
| (2) Methacrylate chromic chloride (Volan) | 27,051 | 13,475 |
| (3) Vinyl triethoxy silane (pH3) | 22,481 | 17,456 |

The invention is particularly useful when the glass fibers are to be used as reinforcement for low pressure thermosetting type resins, for example unsaturated polyester-ethylenic monomer resins such as shown in U.S. Patent No. 2,676,947 granted to Parker. These resins are interpolymers of (A) a polyester of a dihydric alcohol such as ethylene glycol, propylene glycol, 1,3 butylene glycol, diethylene glycol, dipropylene glycol and higher polymers of alkylene glycols, and an alpha, beta ethylenic, dicarboxylic acid such as maleic or fumaric acid with other dicarboxylic acids such as adipic, succinic, azaleic and phthalic acids added and (B) a monomer-soluble in the polyester, containing a terminal ethylenic group, $CH_2=C<$, such as styrene, vinyl acetate, vinyl toluene, allyl esters including allyl acetate, allyl succinate, diallyl phthalate, diallyl cyanurate, triallyl cyanurate, dichloro styrene, etc. The invention is also useful when the glass fibers are to be laminated with other resinous or plastic materials such as polyether or epoxy resins which are condensation polymers of an epihalohydrin and a polyhydroxy phenolic compound and derivatives thereof such as bis-phenol A.

Although the present invention has been described with respect to specific details of certain embodiments thereof, it is not intended that such details act as limitations upon the scope of the invention except insofar as set forth in the accompanying claims.

I claim:
1. A glass fiber treating solution consisting of 99 to 95 percent by weight of water and 1 to 5 percent by weight of a compound represented by the formula

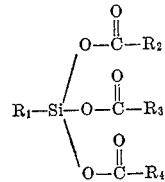

wherein $R_1$ is an alkenyl radical selected from the group consisting of vinyl and allyl radicals and $R_2$, $R_3$ and $R_4$ are alkyl radicals containing from 1 to 5 carbon atoms.

2. The treating solution as described in claim 1 wherein the compound is vinyl triacetoxy silane.

3. A method of treating glass fibers which comprises contacting them with the aqueous solution described in claim 1 and drying the treated fibers to affix the silicon compound to the surface of the glass.

4. The method of claim 3 wherein the silicon compound is vinyl triacetoxy silane.

References Cited in the file of this patent
UNITED STATES PATENTS

| 2,537,073 | Mackenzie et al. | Jan. 9, 1951 |
| 2,658,908 | Nitzsche et al. | Nov. 10, 1953 |
| 2,754,237 | Brooks | July 10, 1956 |
| 2,866,800 | Mackenzie et al. | Dec. 30, 1958 |